United States Patent [19]
Wiggins et al.

[11] Patent Number: 4,869,338
[45] Date of Patent: Sep. 26, 1989

[54] METHOD FOR MEASURING ACOUSTIC IMPEDANCE AND DISSIPATION OF MEDIUM SURROUNDING A BOREHOLE

[75] Inventors: James W. Wiggins, Cypress; Peter S. Aronstan, Katy, both of Tex.

[73] Assignee: Western Atlas International, Inc., Houston, Tex.

[21] Appl. No.: 150,824

[22] Filed: Feb. 1, 1988

[51] Int. Cl.$^4$ .............................................. G01V 1/40
[52] U.S. Cl. ................................... 181/106; 181/119; 367/31; 367/911
[58] Field of Search ................ 367/31, 33, 75, 911; 181/106, 119

[56] References Cited

U.S. PATENT DOCUMENTS

4,715,019 12/1987 Medlin et al. ................ 367/31

Primary Examiner—Thomas H. Tarcza
Assistant Examiner—Ian J. Lobo
Attorney, Agent, or Firm—E. Eugene Thigpen

[57] ABSTRACT

The invention is the use of standing waves to generate a well log. By measuring changes in energy dissipation from the standing wave along the well-bore, the formation may be evaluated for permeability variations may be determined. Variations in the tube wave velocity may be determined from variations in the frequency of a standing tube wave having a selected wave length. Shear wave velocity of the surrounding formation may be determined from the tube wave velocity.

29 Claims, 5 Drawing Sheets

METHOD FOR MEASURING ACOUSTIC IMPEDANCE AND DISSIPATION OF MEDIUM SURROUNDING A BOREHOLE

BACKGROUND OF THE INVENTION

1. Field of the Invention

This invention relates generally to well logging and more particularly to use of acoustic waves to obtain information about a borehole and the surrounding subsurface structure.

2. Description of the Prior Art

In the exploration for and the production of oil and gas it is desirable to discover as much as possible about the subsurface structure of the earth in the area of interest. Once a well has been drilled, it is typical to attempt to gather data about the subsurface structure from the borehole itself. One parameter of the subsurface structure which influences the quantity of oil and gas that can be extracted from a reservoir, and the speed at which the oil and gas can be extracted, is the permeability of the formation.

It is known that sonic waves traveling within a wellbore, sometimes referred to as Stoneley waves and sometimes as tube waves, will be more strongly attenuated while traveling through a borehole surrounded by a more permeable formation than through a borehole surrounded by a less permeable formation. See, for example, "Synthetic Full Waveform Acoustic Logs in Cased Boreholes", *Geophysics* vol. 49, No. 7, July 1984 pp. 1051-1059; and "Application of Full Waveform Acoustic Logging Data to the Estimation of Reservoir Permeability" presented at the 54th Annual SEG Convention, 1984.

In the past, wave attenuation has been measured by detonating a small dynamite charge in a shallow hole near the well head and recording the resulting signal generated in the wellbore with detectors such as hydrophones.

Stoneley waves have also been measured by use of ceramic transmitters and receivers, wherein eight receivers are arranged in an array with 15 cm. between each receiver, and 3.048 m. (10 ft.) from the transmitter to the first receiver. "Vp/Vs in Unconsolidated Oil Sands: Shear From Stoneley", Geophysics, Vol. 52 No. 4, April 1987, pp. 502-513.

Methods of measuring the tube (or Stoneley) wave known to the prior art for evaluating the permeability of a formation have consisted of generating a sonic signal and detecting the magnitude of the wave as it travels past detectors.

Recently, there has been disclosed in U.S. Pat. No. 4,671,379, Kennedy et al, "Method and Apparatus for Generating Seismic Waves", issued June 9, 1987, a source for generating a seismic signal in a borehole. The source includes first and second end means, or operating heads, which are spaced a selected distance apart. The space between the two end means is filled with borehole fluid. Oscillatory or pulsed means may be utilized to excite the fluid between the two end means. By correlating the excitation frequency with the distance between the two end means, a standing wave may be generated. The patent discloses detection of the signal at the surface in order to evaluate the nature of the subsurface structure through which the seismic signal passes between the location of the source in the borehole and the location of the detectors on the surface. It has not, however, been previously suggested that a source for generating standing waves could be utilized for logging permeability variations of a subsurface formation.

SUMMARY OF THE INVENTION

The invention is a method for well logging. A standing tube wave is generated in a segment of the borehole by a tool comprising two end members positioned at selected locations. Energy dissipation of the standing wave is measured. Means may be included in the source for maintaining the energy in the wellbore between the two end members substantially constant and for measuring the amount of energy that it is necessary to supply in order to maintain said constant energy level. Energy may also be supplied to the source at a constant rate and the pressure in the wellbore between the two end members measured to determine energy dissipation. Energy dissipation may also be measured by establishing a steady state standing wave and then discontinuing the injection of additional energy to the standing wave and monitoring the rate of energy decay.

Pressure measurements are normally made substantially at the center of the borehole source. Measurements may also be made at selected positions along the length of the source and exterior to the ends of the source.

Variations in energy dissipation are recorded as a function of depth to enable qualitative observations to be made regarding permeability variations of the subsurface structure surrounding the borehole.

In another aspect of the invention, the variations in the frequency of the standing tube wave as a function of the wavelength of the wave may be measured to determine the shearwave velocity of the surrounding subsurface formation.

DESCRIPTION OF THE PREFERRED EMBODIMENT

Figure 1:
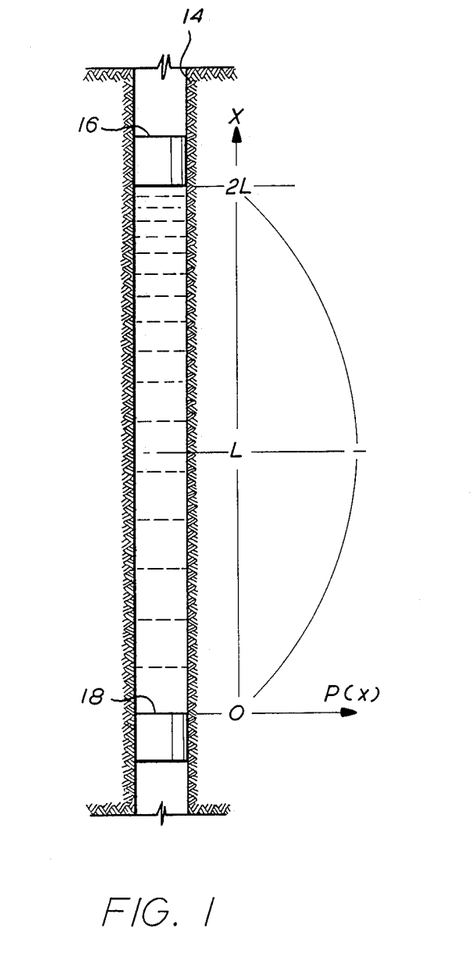
FIG. 1 illustrates the generation of a standing tube wave in a wellbore.

FIG. 1 shows two operating heads, 16 and 18, deployed in a wellbore 14. The wellbore is filled with drilling fluid so that the space between the two operating heads, as well as the space around the operating heads, is filled with drilling fluid.

As shown in FIG. 1, a standing wave is generated between operating heads 16 and 18. The standing wave shown in FIG. 1 is one-half wavelength in length. A half-wavelength standing wave is generated by forming operating heads 16 and 18 so that they have a lower acoustic impedance than the borehole fluid. As discussed in U.S. Pat. No. 4,671,379, hereby incorporated by reference, a standing wave of one-quarter wavelength could be generated by forming operating heads 16 and 18 so that one of the operating heads has a lower acoustic impedance than the borehole fluid and one of the operating heads has a higher acoustic impedance than the borehole fluid.

As shown in FIG. 1, the pressure is a function of location along the borehole between the operating heads and time and is given by the equation:

$$P_{(x,t)} = P_O \sin(\pi ct/2L) \sin(\pi x/2L) + P_B \qquad \text{Eq. (1)}$$

where
 $c$ = borehole fluid compressional sound speed;
 $P_B$ = borehole static pressure;
 $P_O$ = the maximum driven dynamic pressure;
 $t$ = time
 $x$ = distance along the borehole
 $L$ = one-quarter wavelength of the standing wave
The frequency of the oscillation is given by the equation:

$$f = c/4L \qquad \text{Eq. (2)}$$

In the arrangement shown in FIG. 1, the fluid motion is zero at x equal to L and maximum at x equal to 0 and x equal to 2L.

Figure 2:
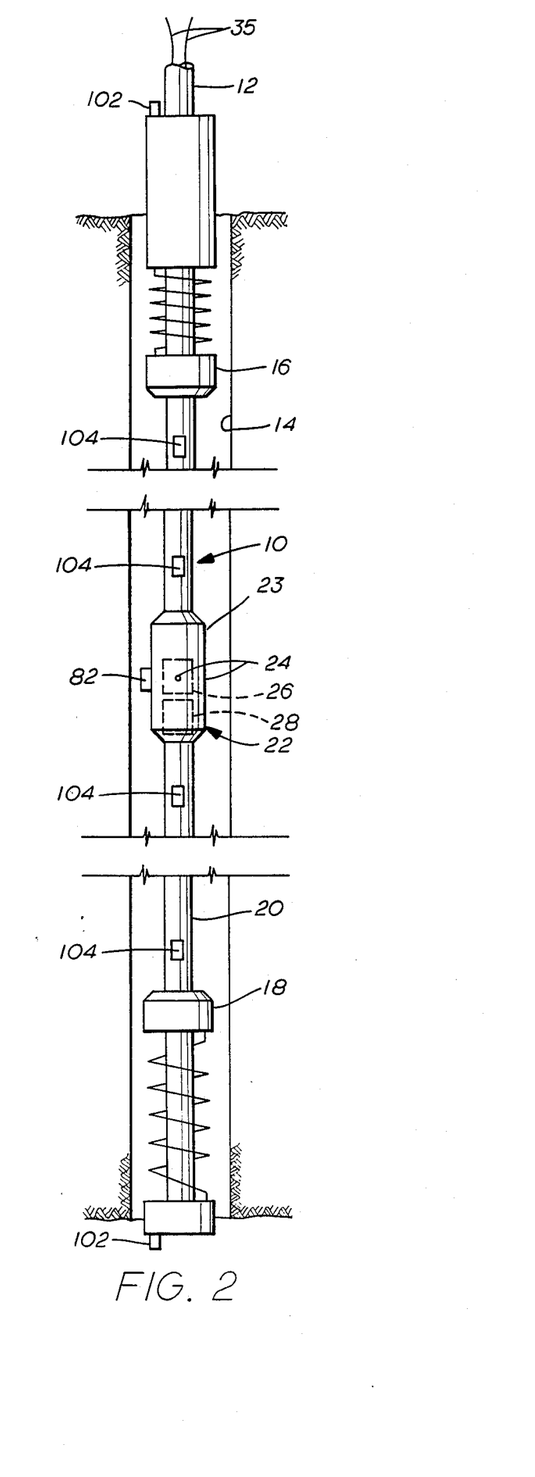
FIG. 2 is a diagram of a borehole tool useful for generating the standing tube wave.

FIG. 2 shows in more detail an apparatus suitable for performing the invention. The device comprises an elongated tool 10 adapted to be lowered down a borehole 14. At the lower end of the tool is an operating head 18. At the upper end of the tool is a similar operating head 16. A conduit 20 interconnects the operating heads 16 and 18 and includes an expanded collar 23 in the center portion thereof. Expanded collar 23 houses an actuator assembly 22 for generating a standing wave in the borehole between the upper and lower operating heads.

Figure 3:
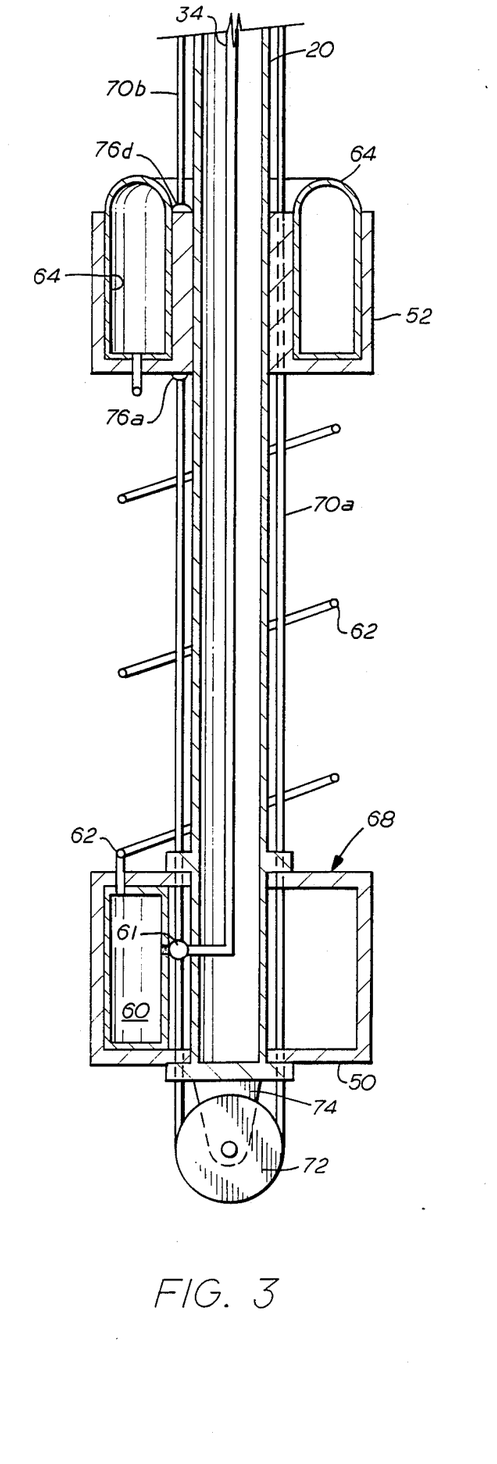
FIG. 3 shows a portion of the borehole tool in greater detail.

Referring to FIG. 3, details of the construction of the operating heads are shown. As shown in FIG. 3, an operating head may include a rigid chamber 50 and a rigid collar 52, the collar 52 being open at the side facing the oscillating fluid. Mounted within the collar 52 is a compressible gas bladder 64. Collar 52 and gas bladder 64 are annular in shape and extend around the circumference of conduit 20. A gas line 62 extending from a gas source or regulator 60 is in communication with bladder 64 and may be used to maintain the bladder at the desired degree of inflation. The gas source may be carried in the tool as shown at 60, or may be at the surface in which case a regulator 60 would be provided in the tool.

Various gases may be used to inflate the bladder 64 depending upon the exact nature of the operating conditions into which the tool is placed. If the tool is to be used at locations very near the surface of the earth, air or nitrogen may be used. However, for use in boreholes having ordinary operating depth of 5,000 to 15,000 feet below the surface, it is necessary to use a much lighter gas that will retain some compressibility at extreme operating pressures. Hence, it is desired to use light gases such as helium, hydrogen, or methane, with helium being the preferred gas because of its low molecular weight and inert nature. The bladders themselves may be constructed from a high temperature elastomer.

Gas may be supplied to the gas bladder in the other operating head through valve 61 and conduit 34.

Figure 4:
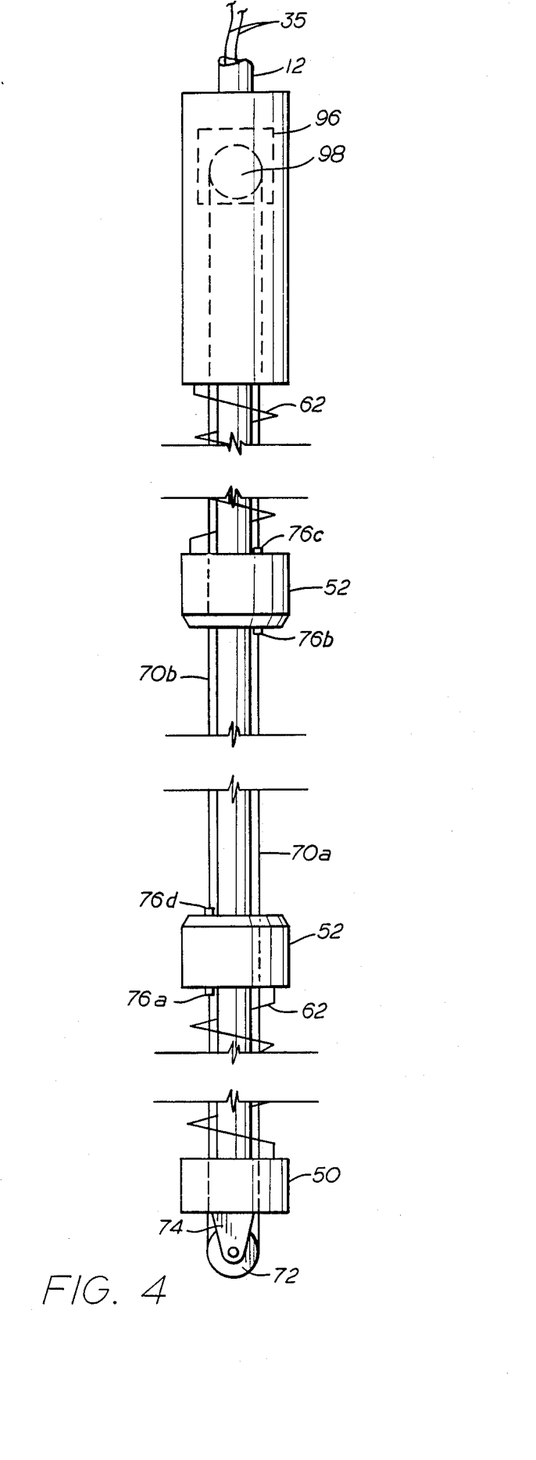
FIG. 4 illustrates the mechanism for changing the length of the standing tube wave.

FIGS. 3 and 4 show the apparatus for moving the operating heads so as to control the length of the standing wave. A cable 70a is attached at a lower surface of lower collar 52 as shown at 76a. The cable then passes over an idler wheel 72 which is held on bracket 74 and then passes along the length of the tool and is affixed to the lower surface of upper collar 52 as shown at 76b. A second cable 70b is attached to the upper surface of upper collar 52 as shown at 76c. Cable 70b then passes over a wheel 98 included within bladder drive means 96 and then extends along the length of the tool and is connected to the upper side of lower collar 52 as shown at 76d. The driving mechanism 96 includes a gearbox and gear (not shown) in order to drive the cable in one direction or another. As the cable moves, the collars 52 are made to move along conduit 20 in either direction depending upon the movement of the cable in order to shorten or extend the standing wave length.

Above upper operating head 16 is an extension 12 of the tool 10 which may continue to the surface or terminate in a clevis to suspend the tool in the borehole. Electrical conductors 35 carry electrical control signals to the tool and output measurements from the tool to a control and data recording instrument.

Figure 5:
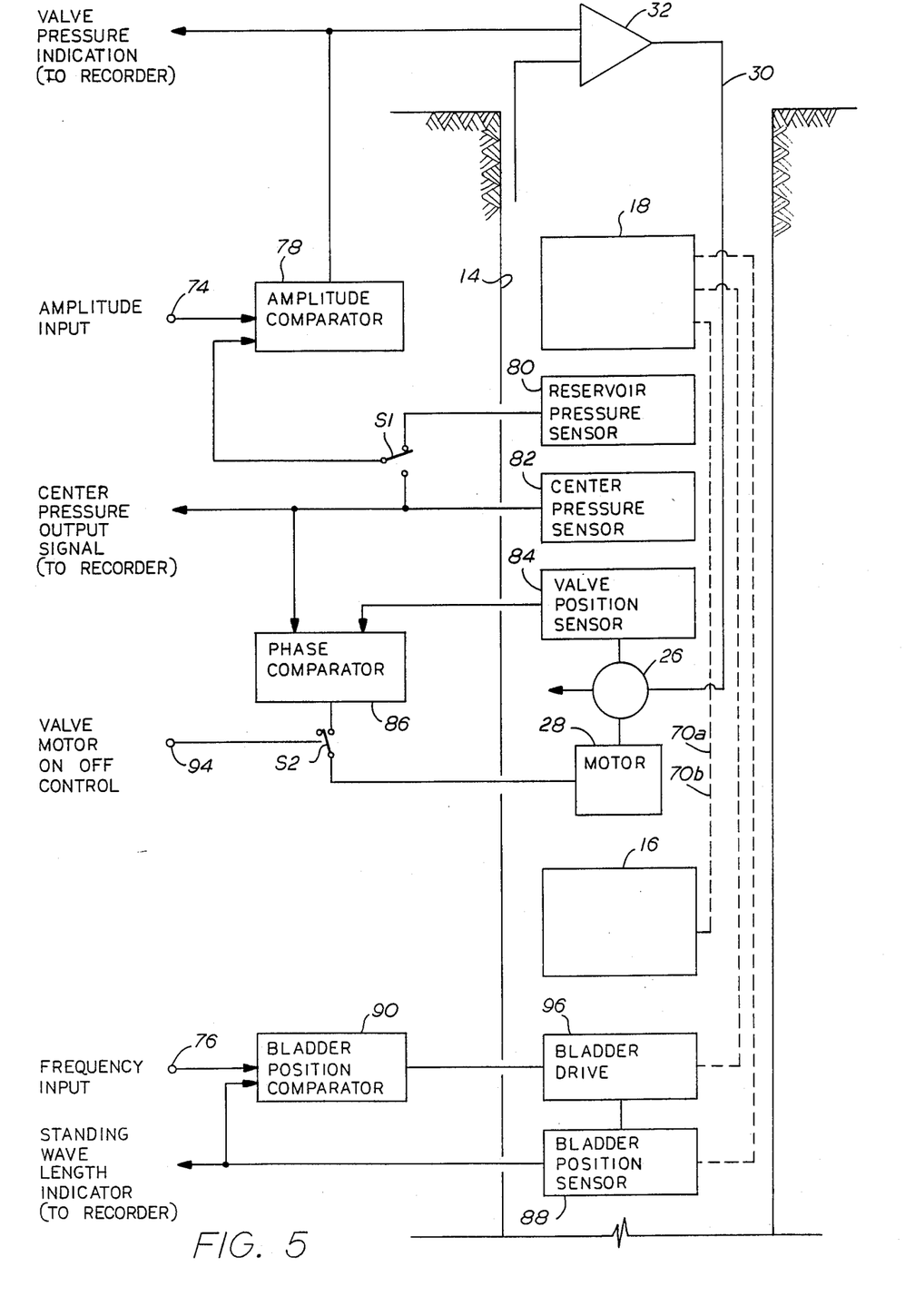
FIG. 5 is a schematic diagram of the control apparatus for practicing the invention.

FIG. 5 is a generalized schematic of the apparatus for performing the invention. The tool 10 is lowered to a location of interest in the wellbore and operating heads 16 and 18 are positioned a selected distance apart. Actuator assembly 22 including valve mechanism 26 and drive mechanism 28 is located between the two heads. The valve mechanism 26 is in fluid communication through a supply conduit 30 with a pump 32 located 14. A pulsation damper (not shown) may be added above valve 26 to reduce pressure fluctuations upstream of valve 26. Although the pump 32 is shown on the surface, it may also be configured as part of the tool 10 and electrical power supplied to it from the surface.

Figure 6:
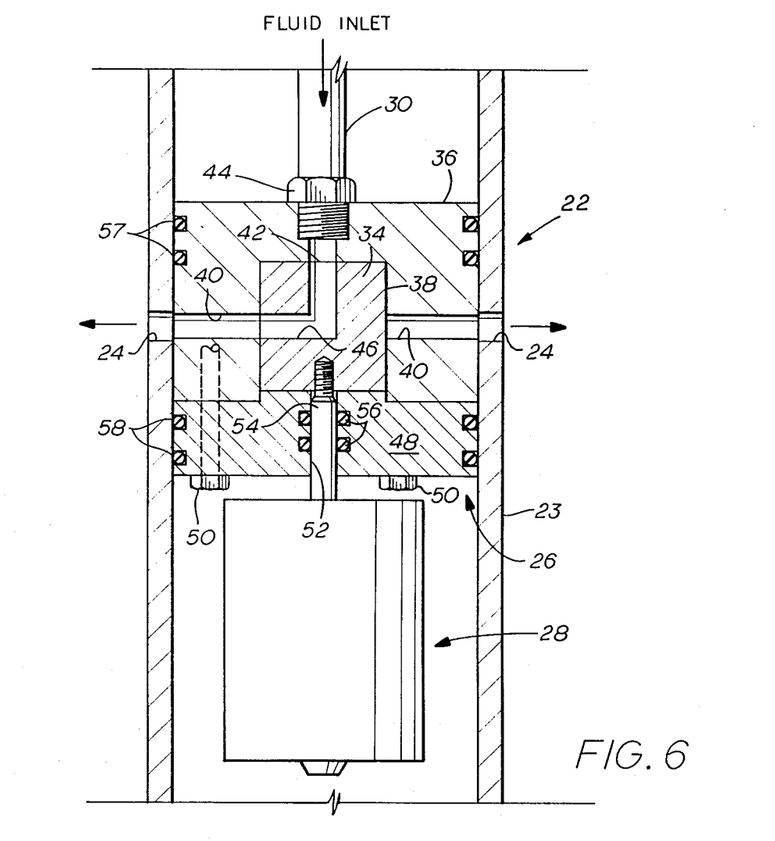
FIG. 6 shows the actuator for injecting additional energy into the standing wave.

FIG. 6 is an enlarged elevational view of the actuator assembly 22 shown in partial cross-section within the expanded collar 23. The expanded collar 23 contains one or more exhaust ports 24. If there is more than one exhaust port, they will normally be located equidistantly around the circumference of the collar. Each exhaust port is placed intermittently in fluid communication with a fluid source by valve mechanism 26 located within the actuator assembly.

Valve mechanism 26 may comprise a cylinder 34 concentrically fitted within chamber 38 within a housing 36. Cylinder 34 includes a conduit 46 therein, a first end of which is in continuous fluid communication with a source of fluid from supply conduit 30 and the second end of which aligns intermittently with passages 40 within housing 36 when the cylinder 34 rotates within housing 36. Passages 40 are, in turn, aligned with exhaust ports 24. The conduit 46 may preferably be L-shaped so that it extends from the side of cylinder 34 to the center thereof and then upward to align with passage 42 in housing 36 and fluid supply conduit 30. Supply conduit 30 may be concentrically coupled to housing 36 by a suitable means, such as threaded coupler 44, so as to be in fluid communication with longitudinal passage 42.

Access to cylinder 34 and the chamber 38 may be provided through end plate 48 anchored concentrically on one end of housing 36 by bolts 50. End plate 48 may contain an axial hole 52 through which a shaft 54 of the drive 28 may extend and threadably engage cylinder 34. O-ring seals 56 may be provided within hole 52 and about shaft 54 so as to prevent fluid leaks.

Figure 7:
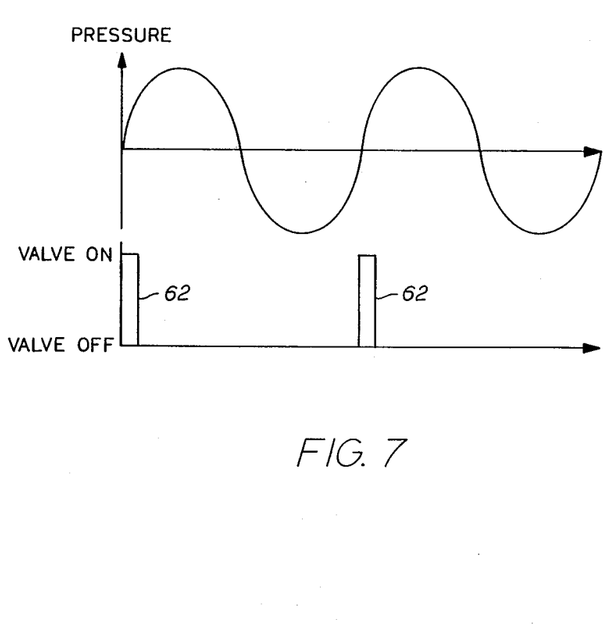
FIG. 7 shows a preferred timing relation between the ejection of additional energy to the standing tube wave and the pressure waveform of the standing tube wave.

The entire valve mechanism 26 and drive 28 are received within the expanded portion 23 of conduit 20. The diameter of the housing and end plate are such that a tight fit occurs and that passages 40 align with the exhaust ports 24. O-ring seals 57 and 58 may be provided about the circumference of the valve mechanism 26 to provide protection to the drive 28. The interior of the tool 10 may be sealed to prevent invasion of the borehole fluid which may result in damage to the drive 28 or other components. The drive 28 operates cylinder 34 within chamber 38. As the cylinder rotates within the chamber, fluid is introduced through supply conduit 30. The fluid enters duct 46 and as the valve rotates, the duct becomes aligned with passages 40 and fluid is discharged through the exhaust ports into the borehole. Each time fluid is discharged through an exhaust port, an energy pulse, as indicated by numeral 62 in FIG. 7, is induced in the fluid within the borehole between operating heads 16 and 18. The frequency of the pulse is controlled by the rate at which the drive 28 rotates the cylinder 34. The frequency is controlled to produce and reinforce a standing wave at the resonant frequency within the space defined between the operating heads 16 and 18.

As explained previously, operation of the source produces a standing pressure wave, with its peak at the centerline of the source and nodes at each end. The hydraulic actuator located within the source supplies the energy to maintain the oscillation. The instantaneous energy contained in the standing wave will be much higher than the energy supplied by the actuator. This ratio will be referred to as the "Q", or Quality Factor, of the system, that is:

$$Q = \frac{\text{instantaneous energy in the standing wave}}{\text{energy supplied in a single oscillation}} \qquad \text{Eq. (3)}$$

The "Q" will be influenced by the permeability of the formation surrounding the borehole. Variations in the construction of the source will also affect the Q, but these variations are substantially "steady state". By measuring deviations of the Q from a calibrated or average situation, information can be obtained about the formation permeability substantially independent of the characteristics of the source.

The source may be operated in either a cased or an uncased borehole. When the source is inside a casing, the effect of the medium outside the casing on the source is reduced, but will still provide measurable effects.

Figure 8:
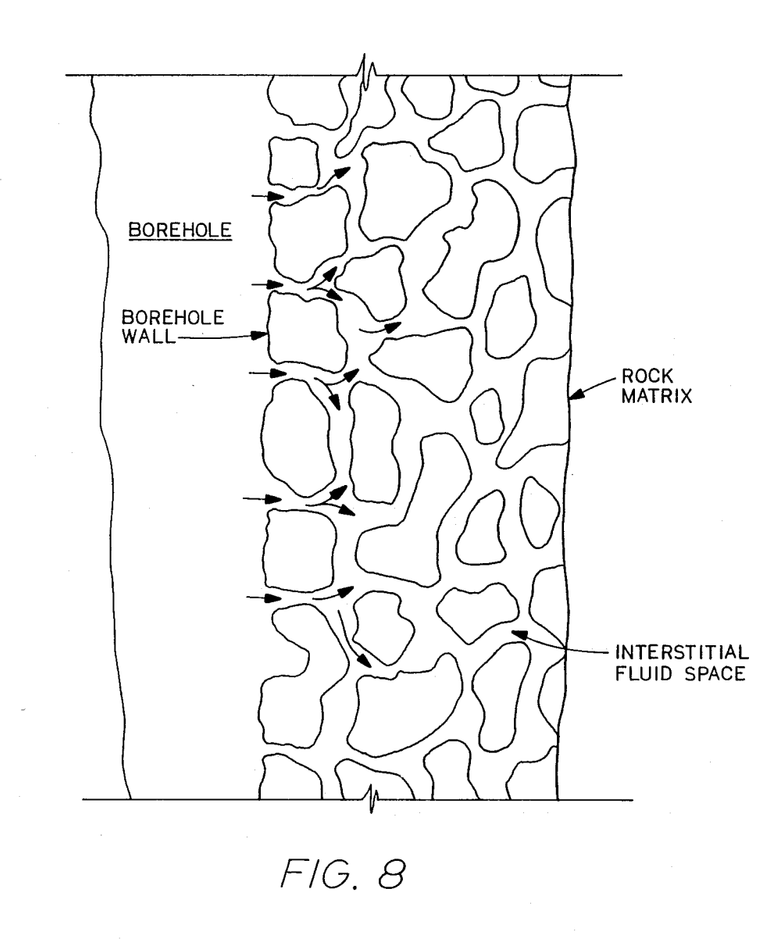
FIG. 8 illustrates the effect of formation permeability on the standing tube wave in an uncased wellbore.

FIG. 8 shows a pictorial view of the region around the borehole wall, depicting the connected pores characteristic of permeable rock. Pore fluid is forced to flow outward from the borehole when the pressure inside the borehole is increased. When the borehole pressure decreases on the alternate phase of the pressure wave, the fluid is forced to flow back toward the borehole. Since all pore fluids are viscous, this fluid flow extracts energy from the borehole wave. Additionally, the increase in fluid pressure in the pores results in increased radiation of energy from the standing wave.

If the rock surrounding the borehole is not permeable, fluid flow is restricted and the amount of energy absorbed from the borehole source is limited. It is this difference in the level of energy absorption that enables permeability to be detected.

Figure 9:
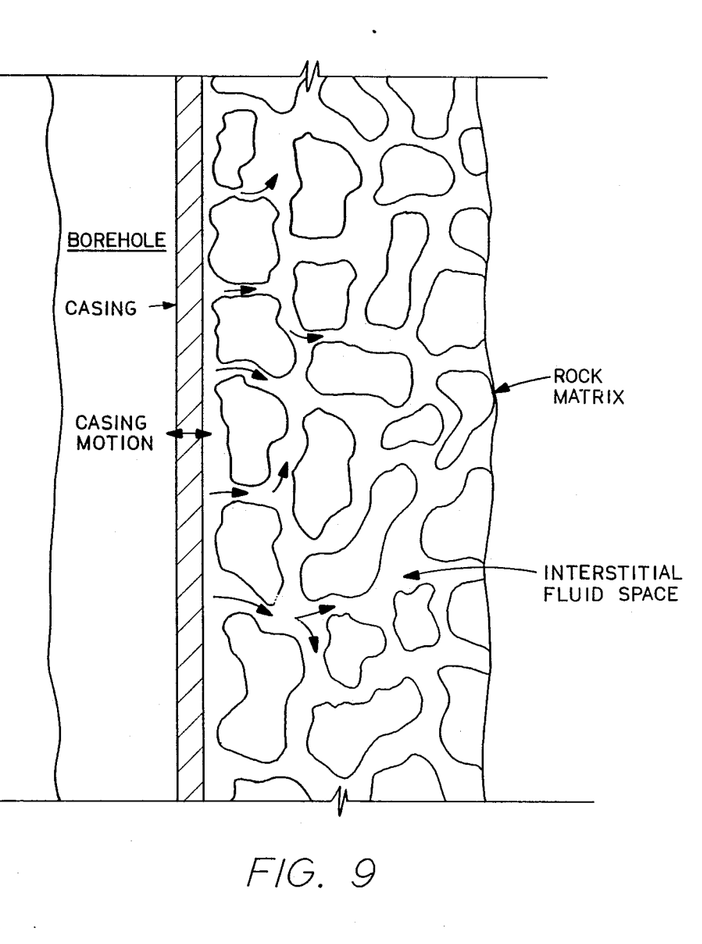
FIG. 9 illustrates the effect of formation permeability on the standing tube wave in a cased borehole.

FIG. 9 shows a pictorial view of a cased borehole. As the wave pressure inside the borehole changes, the casing "breathes" in and out. The motion of the casing induces a pressure in the fluid outside. This outside pressure forces the interstitial fluid to flow through the pores just as in the instance of an uncased hole and results in a net absorption of energy from the standing tube wave. The effect is less than in an uncased well, but the absorptive and radiative mechanisms are the same as for an uncased well.

Well logs may be generated according to the present invention which indicate variations in the shear wave velocity of the formation as well as the permeability of the formation. The velocity of a standing tube wave is given by Eq. 2 as stated previously:

$$c = \frac{f}{4L}$$

where c = fluid compressional sound speed in the borehole (tube wave velocity)
f = frequency of oscillation of the standing wave
L = one-fourth wavelength of the standing wave Although the relation between the shear wave velocity of the formation and tube wave velocity of the borehole is complex, J. E. White, offers the following equations in *Underground Sound, Application of Seismic Waves*, Elsevier, 1983, for deriving the relationship:

$$c = [\rho(1/B + 1/\rho_M V_s^2)]^{-\frac{1}{2}} \qquad \text{Eq. (4)}$$

where c = tube wave velocity
$\rho$ = density of the borehole fluid
B = bulk modulus of the borehole fluid
$\rho_M$ = formation density
$V_s$ = shear wave velocity A block diagram of the control system for practicing the invention is shown in FIG. 5. The Amplitude Input signal to terminal 74 controls the magnitude of the standing wave which is generated. The Frequency Input signal to terminal 76 controls the position of the operating heads and, thereby, the frequency of the standing wave.

Variations in the Q of the system as the tool is moved along the length of the wellbore may be measured in various ways including:

Mode 1. Maintaining the pressure in conduit 30 at the input to valve mechanism 26 constant as the tool is moved from one location to another along the length of the borehole so as to maintain the energy supplied to the standing wave at a substantially constant rate and measuring the resulting pressure in the standing wave in the wellbore.

Mode 2. Maintaining the pressure in the standing wave at substantially a constant level as the tool is moved from one location to another along the length of the borehole and measuring the pressure at the input to valve mechanism 26 which must be supplied by means of conduit 30 to maintain this constant pressure level in the standing wave.

Mode 3. The tool may be initially operated in either mode 1 or mode 2 referred to above at each wellbore location where a measurement is made for a sufficient time for a steady state standing wave pressure oscillation to be obtained. At a selected time, the actuator valve is stopped to discontinue adding additional energy to the standing wave and the rate of decay of the standing wave is measured. The Q of the tool is determined from the decay rate by the formula:

$$Q = \frac{-4\pi fT}{\ln(0.1)} \qquad \text{Eq. (5)}$$

where
f=resonant frequency of the standing wave
T=time required for the pressure oscillation to decrease in amplitude to 0.1 times the steady-state amplitude.

The Amplitude Input signal is applied to an input to amplitude comparator 78. When operating in mode 1 referred to above, switch S1 is connected so that the output from reservoir pressure sensor 80 is connected to the other input to comparator 78. Reservoir pressure sensor 80 may comprise a standard silicon strain gauge familiar to those of ordinary skill in the art. Reservoir pressure sensor 80 senses the pressure of the fluid supplied to valve mechanism 26. When sensor 80 indicates the pressure is dropping, comparator 78 will react by increasing the magnitude of its output which is applied to pump 32. Pump 32 then increases the magnitude of the fluid pressure in the valve mechanism so as to maintain the pressure at a constant level. If pressure sensor 80 indicates the pressure is increased, then amplitude comparator 78 will act in the reverse manner. Amplitude comparator 78, as well as phase comparator 86 and bladder position comparator 90, referred to hereinafter, may comprise standard comparator circuits, familiar to those of ordinary skill in the art.

Center-line pressure sensor 82 measures the pressure in the wellbore at the center line of the borehole source; that is, at the mid-point between operating heads 16 and 18. Center-line pressure sensor 82 may comprise a standard silicon strain gauge, familiar to those of ordinary skill in the art. By comparing the output of sensor 82, which indicates the magnitude of the energy in the standing wave, to the energy being added to the system, which is determined from the fluid pressure in the actuator, the Q of the system may be determined. The instantaneous energy in the standing wave will be substantially proportional to the square of the center-line pressure measurement of the standing wave. The energy added to the standing wave during one cycle will be substantially proportional to the square of the pressure of the fluid in the actuator (valve mechanism) and the time duration during which the fluid is injected through apertures 24. The proportional constants for these pressure-energy relations may be measured for any particular configuration of the borehole source by techniques familiar to those of ordinary skill in the art.

When operating in mode 2 referred to above, switch S1 is connected so that the output from the center-line pressure sensor 82 is connected to the input of amplitude comparator 78. If the energy magnitude of the standing wave begins to decrease, then the output of amplitude comparator 78 increases so as to cause pump 32 to increase the pressure of the fluid supplied to valve mechanism 26 until the energy level in the standing wave reaches the level selected by the Amplitude Input signal. By measuring the output signal to pump 32 from amplitude comparator 78, the magnitude of the energy supplied to the source to maintain the standing wave at a selected level is determined and the Q of the system may be determined by comparing this energy magnitude to the magnitude of the energy in the standing wave.

In mode 3, the tool is initially operated in either mode 1 or mode 2 until an equilibrium is reached. A signal is then applied to terminal 94 to switch S2 to the off position to disconnect the input to motor 28 from phase comparator 86. Motor 28 will then stop, and additional energy will no longer be supplied to the standing wave. The "Q" of the system may then be determined by the decay time of the standing wave as stated above.

The position of cylinder 34 within valve mechanism 26 is monitored by valve position sensor 84. Valve position sensor 84 may comprise a resolver on the shaft of valve motor 28. The output of sensor 84 will indicate the position of conduit 46 in relation to apertures 24. The output of valve position sensor 84 is applied to an input to phase comparator 86. The output of center-line pressure sensor 82 is applied to the other input of phase comparator 86. Phase comparator 86 compares the phase of these two signals and its output then controls the speed of rotation of valve motor 28 to maintain a selected phase relationship between the ejection of fluid from the apertures and the phase of the standing wave. This phase relationship may be selected, for example, to maintain the timing relationship between the ejection of pressured fluid from aperture 24 and the standing wave at the source center so that, as shown in FIG. 7, the ejection of the pressurized fluid leads the standing wave peak pressure by about 90°.

Bladder position sensor 88 senses the position of the bladders 64 included in operating heads 16 and 18 which enables the length of the standing wave to be determined. In a preferred embodiment, the position sensor 88 may comprise a resolver within motor, or driving mechanism, 96. From observation of the position of the motor, the position of bladders 64 are determinable and, hence, the length of the standing wave. The position of bladders 64 is controlled by the Frequency Input signal, connected to input terminal 76, which is applied to bladder position comparator 90. The output of bladder position sensor 88 is applied to the other input of bladder position comparator 90. The output of comparator 90 controls driving mechanism 96 to maintain the distance between the operating heads at the selected distance. The frequency of the resulting wave is determined from the output of center-line pressure sensor 82. The tube wave velocity is determined from the frequency and wave-length of the standing wave as previously stated in Eq. 3.

The amount of energy dissipation from the standing tube wave will be influenced by factors such as the lithology of the formation, the porosity, and the type of fluid within the formation as well as by permeability. In general, the interpretation of well logs performed according to this invention depends on comparison between logs from different wells drilled at locations where the structure of the earth is similar. Formulas are known to the prior art for relating energy dissipation of a tube wave to the permeability of a formation. See for example, J. E. White, *Underground Sound, Application of Seismic Waves,* Elsevier, 1983 pp. 151-154. However, proper interpretation of well logs performed according to the present invention may depend strongly on accumulated interpretation experience.

Normally, additional forms of well logs known to the prior art will also be conducted. These may include porosity, resistivity, neutron density and gamma logs.

By methods known to the prior art the lithology and the type of formation fluid will be determined as a function of depth. By utilizing the well log performed according to the present invention, variations in energy dissipation within zones having similar lithology formation fluid may be observed to determine variations in permeability. Variations in the well bore itself will affect the well log. For example, if the diameter of the borehole varies, there will be a resulting variation in the energy escaping past the two end members (operating heads). Accordingly, it may be preferable to position pressure sensors 102 exterior to the borehole tool at each end thereof to monitor the fluid pressure just outside the borehole tool. The energy lost at each end of the tool can be determined from the measured pressure and subtracted from the apparent energy loss determined from measurements within the borehole tool, in order to more accurately assess variations in formation permeability.

It may be desirable to position pressure sensors 104 along the length of the borehole tool as shown in FIG. 2. By monitoring the pressure along the length of the tool, variations of the standing wave from a pure sinusoidal (cosine) wave may be determined. Variations from a pure sinusoidal wave may result from variations in characteristics of the formation along the length of the borehole source and will enable a log analyst to determine more accurately where the changes in the formation occurred. Variations of the standing wave from a pure sinusoidal wave may also indicate casing defects and faults in cementing.

Well logs conducted according to this invention may be evaluated to detect defects in casing joints or the casing pipe and to evaluate the quality of the cement bond and the cement integrity.

Typically, the well log is conducted by lowering the tool in the well to the lowest region of interest. A desired excitation frequency is selected and the end members are displaced to achieve the desired frequency.

In general, energy dissipation resulting from increased permeability is greater at lower standing wave frequencies, so that better signal amplitude definition may be obtained from lower frequencies. However, the lower the frequency of the standing wave, the longer the distance between the two end members of the borehole tool is required to be, which degrades the spatial definition. Reducing the spacing between the two end members reduces the borehole span which is contributing to the signal, thereby providing improved signal spatial definition. Decreasing the distance between the two end members, however, increases the standing wave frequency, thereby reducing the magnitude of the signal. It may be desirable to conduct one log by operating the borehole source at one frequency while lowering the source into the wellbore and to perform a second log at a different frequency while retrieving the source from the wellbore.

It is also possible to generate a swept frequency signal, wherein the resonant frequency sweeps from a first beginning frequency to a second end frequency. It may be desirable to maintain the source at substantially a fixed position when transmitting a swept frequency signal, in order to better correlate the signal with borehole depth.

For illustrative purposes, our invention has been described with a certain degree of specificity. Variations will occur to those skilled in the art but which may be included within the scope and spirit of this invention which is limited only by the appended claims.

We claim:
1. A method of well lodging comprising:
generating a substantially steady state standing tube wave in fluid substantially filling the space between two end members of an energy source at selected locations within a wellbore, said energy source including means for adding energy to said standing tube wave to maintain said standing tube wave at said substantially steady state; and
discontinuing the addition of energy to said standing tube wave and measuring the rate of decay of said standing tube wave at said selected locations to determine Q of the energy source, where Q is the ratio between the instantaneous energy in the standing wave and the energy supplied during a single oscillation of the standing wave.

2. The method of claim 1 wherein Q is determined from the relation:

$$Q = \frac{-4\pi fT}{\ln(0.1)}$$

where:
f = resonant frequency of the standing tube wave;
T = time required for the pressure oscillation to decrease in amplitude to 0.1 times a steady state amplitude.

3. The method of claim 2 wherein the frequency of said standing tube wave generated at said selected locations is maintained substantially constant.

4. The method of claim 1 wherein the frequency of said standing tube wave generated at said selected locations is maintained substantially constant.

5. A method of well logging comprising:
utilizing an energy source to generate a substantially steady-state standing tube wave within a wellbore at selected locations, said energy source including means for adding energy to said standing tube wave to maintain said standing tube wave at said substantially steady state;
measuring the pressure within said standing tube wave to determine the instantaneous energy in said standing tube wave;
measuring the energy added to the standing tube wave during each oscillation of the standing tube wave; and
determining the ratio between the energy in said standing tube wave and the energy added to the standing wave during each cycle of said standing tube wave for a plurality of said selected locations.

6. The method of claim 5 wherein said energy source includes two end members positioned in the wellbore and said standing wave is generated in drilling fluid which substantially fills the wellbore between said two end members.

7. The method of claim 3 whereon the energy added to the standing wave during the successive oscillations of the standing tube wave is maintained substantially constant.

8. The method of claim 7 wherein the frequency of said standing tube wave generated at said selected locations is maintained substantially constant.

9. The method of claim 3 wherein the peak pressure within said standing tube wave is maintained substantially constant.

10. The method of claim 9 wherein the frequency of said standing tube wave generated at said selected location is maintained substantially constant.

11. The method of claim 6 wherein the frequency of said standing tube wave generated at said selected locations is maintained substantially constant.

12. A method of generating a well log useful in evaluating the permeability of the formation surrounding a wellbore comprising:
generating a standing tube wave in fluid substantially filling the space between end members at selected locations along the length of the wellbore by periodically adding pulsed energy to said standing wave; and
determining the Q of the source utilized for generating the standing tube wave where Q is the ratio between the energy in said standing tube wave and the energy added to said standing tube wave during each cycle of said standing tube wave at said selected locations.

13. The method of claim 12 wherein the pulsed energy added to the standing tube wave at said selected locations is maintained substantially constant and the resulting pressure in the standing wave is measured to determine the Q of the source utilized for generating the standing tube wave at said selected locations.

14. The method of claim 12 wherein the pressure in the standing wave is maintained substantially constant and energy added to the standing wave to maintain said constant pressure is measured to determine the Q of the source utilized for generating the standing tube wave at said selected location.

15. The method of claim 12 where the Q of the source utilized for generating the standing tube wave is determined by discontinuing the adding of pulsed energy to the standing tube wave, and measuring the rate of decay of energy in the standing wave, and utilizing the relation $$Q = \frac{-4\pi fT}{\ln(0.1)}$$

where:
f=resonant frequency of the standing tube wave;
T=time required for the pressure oscillation to decrease.

16. A method of well logging comprising:
applying a first input signal related to a desired magnitude of a standing tube wave to a first comparator means, said comparator means having an output which varies the magnitude of energy added to said standing tube wave;
measuring the magnitude of the energy of said standing tube wave;
applying the measured magnitude to a second input to said first comparator means to control the output thereof to maintain the energy of said standing tube wave substantially at said desired magnitude;
applying a second input signal related to the desired wavelength of said standing wave to a second comparator means, said comparator means having an output that varies the position of end members within which said standing wave is generated;
detecting the distance between said end members;
applying the detected distance to a second input to said second comparator to control the output thereof to maintain the distance between the end members at the desired distance;
measuring the magnitude of the energy added to said standing tube wave; and
measuring the frequency of the resulting standing tube wave.

17. The method of claim 16 further comprising determining the Q of the standing wave source where
Q=instantaneous energy in the standing wave energy supplied during a single oscillation of the standing tube wave 18. The method of claim 16 further comprising determining the velocity of the standing tube wave from the relationship $$c = f/4L$$

where
c=tube wave velocity
f=frequency of oscillation of the standing tube wave

19. The method of claim 18 wherein said measurements are performed at a plurality of locations along a wellbore.

20. The method of claim 17 further comprising measuring the magnitude of the standing wave energy at selected locations along the length of the standing tube wave.

21. The method of claim 20 further comprising measuring the magnitude of the standing wave energy escaping past the end members and utilizing said measured magnitude of energy to correct for the determination of Q.

22. A method of well logging comprising:
applying to a first comparator means a first input signal related to a selected steady state energy magnitude desired to be added to a standing tube wave in a wellbore, said first comparator means having an output which varies the magnitude of energy added to said standing tube wave;
measuring the magnitude of energy added to said first standing tube wave;
applying the measured magnitude to a second input to said first comparator means to control the output thereof to maintain the magnitude of energy added to said standing wave at substantially said selected magnitude; applying a second input signal related to the desired wavelength of said standing wave to a second comparator means, said comparator means having an output that varies the position of end members within which said standing wave is generated;
detecting the distance between said end members;
applying the detected distance to a second input to said second comparator means to control the output thereof to maintain the distance between end members at the desired distance;
measuring the energy magnitude of the resulting standing tube wave; and
measuring the frequency of the resulting standing tube wave.

23. The method of claim 22 further comprising determining the Q of the standing wave source where
Q=instantaneous energy in the standing wave energy supplied during a single oscillation of the standing wave.

24. The method of claim 22 further comprising determining the velocity of the standing tube wave from the relationship $$c = f/4L$$

where c=tube wave velocity f=frequency of oscillation of the standing wave

L=one-quarter wavelength of the standing wave

25. The method of claim 24 wherein said measurements are performed at a plurality of locations along a wellbore.

26. The method of claim 23 further comprising measuring the magnitude of the standing wave energy at selected locations along the length of the standing tube wave.

27. The method of claim 26 further comprising measuring the magnitude of the standing wave energy escaping past the end members and utilizing said measured magnitude of energy to correct for the determination of Q.

28. A method of well-logging comprising:

generating a standing tube wave in a wellbore by means of a source comprising two end members;

applying an input signal related to the desired wavelength of said standing wave to a comparator means, said comparator means having an output that varies the separation between said end members;

detecting the separation between said end members and generating a feedback signal related to said detected separation;

applying the feedback signal to a second input to said second comparator means to control the output thereof to maintain the desired wavelength of the standing tube wave;

measuring the frequency of the resulting standing tube wave;

calculating the velocity of the standing tube wave from the wavelength and frequency measurements.

29. The method of claim 28 further comprising determining the formation shear wave velocity from the borehole tube wave velocity.

* * * * *